Jan. 25, 1955 M. W. GALLIERS 2,700,303
AUTOMATIC AIR BLEED FOR HYDRAULIC FORCE MEASURING SYSTEMS
Filed Feb. 28, 1951
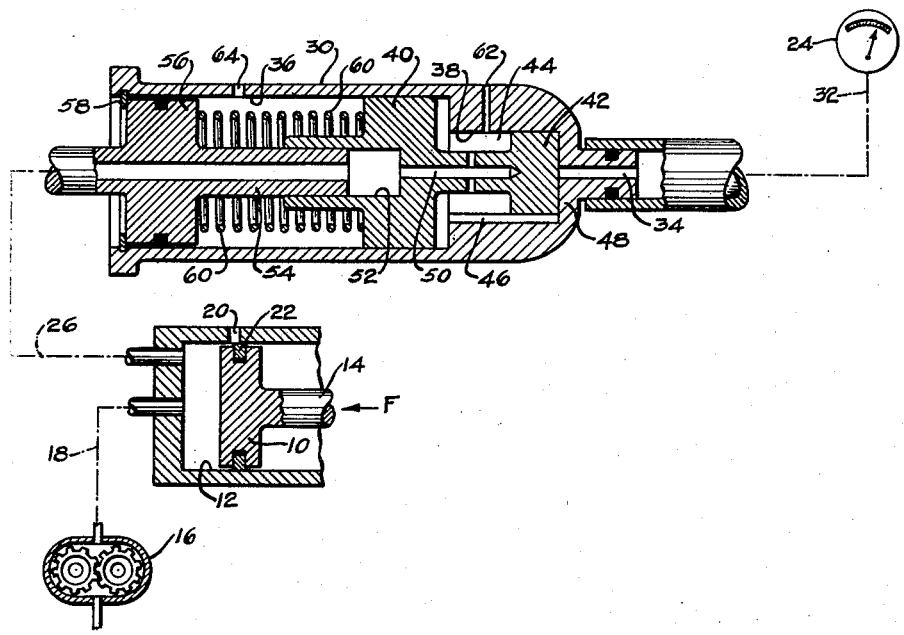
INVENTOR
MARSHALL W. GALLIERS
BY
ATTORNEY

United States Patent Office 2,700,303
Patented Jan. 25, 1955

2,700,303

AUTOMATIC AIR BLEED FOR HYDRAULIC FORCE MEASURING SYSTEMS

Marshall W. Galliers, Radburn, N. J., assignor to Curtiss-Wright Corporation, a corporation of Delaware Application February 28, 1951, Serial No. 213,069

6 Claims. (Cl. 73—141)

This invention relates to hydraulic mechanism and is particularly directed to such mechanism in which the magnitude of a hydraulic pressure is automatically controlled by a force to be measured.

Hydraulic mechanism is commonly used for measuring the torque output of an aircraft engine, said mechanism providing a hydraulic pressure balancing a force which is proportional to the magnitude of the torque to be measured; for example as disclosed in Patent Nos. 2,289,285, 2,233,498 and 2,461,001. Such torque meters comprise a piston movable in a cylinder against a liquid under pressure supplied to said cylinder by a pump, said liquid continually bleeding or draining through a restricted opening from the cylinder during operation of the mechanism and the piston being movable to vary the magnitude of the liquid pressure within the cylinder so that said pressure always balances a torque proportional force acting against the piston. In addition, a passage or conduit connects a pressure gage to the torque meter cylinder for measuring the liquid pressure therein whereby said gage can be calibrated to read directly the magnitude of the torque transmitted. When the engine is shut down, the liquid drains from the torque meter cylinder and from the pressure gage supply passage with the result that when the engine is subsequently started a considerable amount of air may become trapped in the torque meter gage supply passage. This trapped air causes erratic operation of the torque meter gage.

An object of the present invention comprises the provision of a novel and simple arrangement for automatically removing air or other gases from said pressure gage supply passage.

Other objects of the invention will become apparent from the annexed detailed description in connection with the drawing which comprises a schematic view of a conventional torque meter with means embodying the present invention disposed in the torque meter gage supply passage for automatically bleeding air or other gases from said passage.

Referring to the drawing, a piston 10 is slidable in a cylinder 12, said piston having a piston rod 14 by means of which a force F to be measured is applied to said piston. A pump 16 supplies a liquid, such as oil, to the cylinder 12 through a passage 18, the liquid pressure within said cylinder acting against the piston 10 in opposition to the force F. The cylinder 12 is provided with a restricted vent or drain opening 20 and the piston 10 has a piston ring 22 controlling the extent to which the vent 20 is open.

With this construction, the piston 10 automatically assumes a position in which the force F and the force exerted by the liquid pressure within the cylinder 12 against the piston 10 balance. Thus, upon an increase in the magnitude of the force F, said force and the liquid pressure force against the piston 10 temporarily become unbalanced whereupon the piston 10 moves to the left (as viewed in the drawing) in response to said unbalance until the vent 20 has been closed to an extent sufficient to raise the pressure within the cylinder 12 to rebalance said forces. Similarly, upon a decrease in the force F, the piston moves to open the vent further until said forces are again balanced. In this way the liquid pressure within the cylinder 12 is always proportional to the magnitude of the force F. A liquid pressure gage 24 is connected to the cylinder 12 through a passage 26, said gage closing the end of the passage 26 remote from the cylinder 12. Since the pressure in the cylinder 12 is maintained proportional to the force F, the gage 24 can be calibrated to read directly this force or any factor proportional thereto.

The structure so far described is conventional and therefore has only been schematically illustrated. In the case of a torque meter, the piston 10 may serve to anchor a reaction member of a transmission in which case the force F is proportional to the magnitude of the torque transmitted and the gage 24 can be calibrated to read said torque directly. Such an arrangement is disclosed in the aforementioned patents.

Such torque meters are generally provided on aircraft engines for measuring the output torque of said engine, the pump 16 being driven by said engine. With the structure so far disclosed, when the engine is shut down, oil drains out of the torque meter gage passage 26 through the vent 20 and other leakage paths. Therefore, when the engine and its pump 16 are subsequently started, air becomes trapped in the gage passage 26. The presence of this trapped air in the passage 26 causes the indications of the gage 24 to be erratic. This erratic operation of the torque meter gage 24 may be caused by excessive travel of the torque meter piston 10 upon an increase or decrease in the magnitude of the force F because the air trapped in the system must first be compressed or expanded in order to produce the required change in the hydraulic pressure force against the piston 10 to rebalance the force F. For example, upon an increase in the magnitude of the force F the piston 10 starts to move to close the vent 20. However the trapped air must first be compressed before the hydraulic pressure changes to an extent corresponding to said closing adjustment of the vent 20 so that the piston 10 will continue to travel and will close the vent 20 too much with the result that the hydraulic pressure force against the piston 10 will overshoot the force F thereby causing the system to hunt.

To prevent said erratic operation of such an aircraft engine torque meter, it is common practice to bleed air manually from the torque meter gage passage 26 when the engine is started. In accordance with the present invention means are provided for automatically bleeding air from said passage. For this purpose, a fixed housing 30 and a passage 32 are interposed between the pressure gage passage 26 and the pressure gage 24, preferably as close as possible to the pressure gage 24. The housing 30 has a stepped bore therethrough comprising a small diameter bore 34 at its downstream end, a large diameter bore 36 at its upstream end and a bore 38 of intermediate diameter co-axially disposed between the bores 34 and 36. A large piston 40 is slidably fitted within the large diameter bore 36 and a small piston 42 is slidably fitted within the intermediate diameter bore 38, said pistons being connected together and spaced from each other to form the space 44 between said pistons.

The wall of the bore 38 is provided with one or more grooves 46 extending axially to the shoulder 48. The shoulder 48 forms a valve seat and the adjacent end of the small piston 42 constitutes a movable valve element cooperable with the valve seat 48. Thus, when the adjacent or valve end of the piston 42 moves away from the valve seat 48, fluid can flow from the space 44 into the small diameter bore 34 and thence into the passage 32 to the pressure gage 24. When, however, the piston 42 moves against the valve seat 48, the bore 34 and pressure gage passage 32 are closed to prevent leakage therefrom.

The large piston 40 has a passage 50 therethrough communicating with the inter-piston space 44. The upstream end of the piston passage 50 is enlarged as indicated at 52 for slidably receiving an extension 54 of the passage 26 extending into the housing 30 whereby the passage 26 is continuously in communication with the inter-piston space 44. The extension 54 also has an annular flange 56 fitted within the large diameter bore 36 of the housing 30, said flange being spaced from the end of the extension 54 and being held in position within the bore 36 between a snap ring 58 and a spring 60.

The spring 60 also acts against the pistons to urge the valve end of the small piston 42 against the valve seat 48 to close the bore 34 and passage 32. The inter-piston space 44 is provided with a restricted vent 62 preferably on its upper-most side. The space behind the large piston 40 is also vented as indicated at 64.

With the structure described, when the engine and pump 16 are shut down, the spring 60 immediately moves the pistons 40 and 42 to the right (as viewed in the drawing) so that the small piston abuts the valve seat 48 thereby closing the bore 34 and passage 32 to prevent leakage of oil therefrom. Oil in the passages 26 and 50 and in the space 44 will drain out through the torque meter cylinder drain 20 and through other points of leakage.

When the engine and pump 16 are subsequently started, the oil supplied by said pump 16 first fills the torque meter cylinder 12, any air within said cylinder escaping through the vent 20, and then said oil fills the passages 26 and 50 and the space 44 and in so doing any air therein escapes through the vent 62. During this initial phase of the operation the small piston 42 remains seated on the valve seat 48 thereby keeping the bore 34 and passage 32 full of oil. After the passages 26 and 50 and the space 44 have been filled with oil, the liquid pressure will rise in the space 44 whereupon said pressure will force the pistons 40 and 42 against the spring 60 (to the left as viewed in the drawing) because of the larger area of the piston 40 exposed to the pressure in the chamber 44 as compared to the area of the piston 42 exposed to said pressure. This movement of the pistons 40 and 42 against the spring 60 opens the valve seat 48 to the space 44 whereupon the gage 24 is placed in communication with and responds to the pressure in the torque meter cylinder 12. At the same time the piston 42 covers the vent 62 to prevent continual leakage of oil therefrom. Motion of the pistons 40 and 42 against the spring 60 is limited by the piston 40 abutting the adjacent end of the extension 54. In this way, means have been provided for automatically preventing entrappment of air in the passages between the torque meter cylinder 12 and the pressure gage 24 during operation of said torque meter.

When the gage 24 is first installed, it probably will be necessary to bleed air from its passage 32 to permit oil to enter and fill said passage. When, however, said passage 32 has once been filled with oil, said passage will automatically remain full, the valve 42, 48 automatically closing to keep said passage full when the system is shut down.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination: a body member having a chamber, said chamber having a relatively large diameter bore co-axial with a relatively small diameter bore; a pair of spaced piston-like members, the one being larger than the other with the large piston-like member being slidable within said large diameter bore and with the small piston-like member slidable within said small diameter bore, said pistons being connected together for joint movement whereby the fluid pressure in the space between said piston-like members urges said piston-like members in the direction of the force exerted by said pressure against the large piston-like member; said large piston having a passage therethrough to said inter-piston space; means including a first passageway communicating with said piston passage; means including a second passageway; said body-member also having a restricted vent communicating with said inter-piston space, said small piston having a first portion for controlling flow from said inter-piston space to said second passageway and having a second portion for controlling said vent such that movement of said piston-like members in said direction opens said second passageway to said inter-piston space and closes said vent; means for supplying a liquid under pressure to said first passageway for flow therethrough to said piston passage and thence into said inter-piston space whereupon when the fluid pressure within said inter-piston space exceeds a predetermined value the piston-like members move in said direction to close said vent and to open said second passageway to said inter-piston space for liquid flow therefrom into said second passageway; and elastic means for moving said piston-like members in the opposite direction when the fluid pressure in said space drops below a predetermined value thereby opening said vent and closing said second passageway to said inter-piston space.

2. In combination; means providing a passageway; means closing one end of said passageway and responsive to the pressure at said end; a valve disposed in said passageway between a first portion including said end and a second portion such that when open said valve connects said passageway portions and when and as long as said valve is closed it seals and closes said passageway first portion from said passageway second portion; means operatively connected to said valve and responsive to the pressure in said passageway second portion for automatically opening said valve when said pressure exceeds a predetermined value and holding said valve open as long as said pressure exceeds said predetermined value; elastic means urging said valve in a closing direction for automatically closing said valve when said pressure drops below a predetermined value; vent passage means communicating with only the second portion of said passageway when the valve is closed; and means operatively connected to said valve for automatically closing said vent passage means substantially simultaneously with opening of said valve.

3. In combination: means providing a passageway; means closing one end of said passageway and responsive to the pressure at said end; a valve disposed in said passageway between a first portion including said end and a second portion such that when open said valve connects said passageway portions and when and as long as said valve is closed it seals and closes said passageway first portion from said passageway second portion; means for supplying a liquid under pressure to said passageway second portion; a piston-like member operatively connected to said valve and having one side subjected to the pressure in said passageway second portion for automatically opening said valve when said pressure exceeds a predetermined value and holding said valve open as long as said pressure exceeds said predetermined value; passage means for continuously venting the other side of said piston-like member; elastic means urging said valve in a closing direction for automatically closing said valve when said pressure drops below a predetermined value; vent passage means communicating with only the second portion of said passageway when the valve is closed so that upon the supply of liquid to said passageway second portion substantially all gas in said passageway second portion is first expelled through said vent passage means before the pressure in said passageway second portion increases sufficiently to open said valve; and means operatively connected to said valve for simultaneous movement therewith for automatically closing said vent passage means substantially simultaneously with opening of said valve.

4. A hydraulic force measuring system comprising means providing a cylinder; a movable piston-like member closing one end of said cylinder; means for supplying a liquid under pressure to said cylinder against said piston-like member; means for subjecting said piston-like member to a force urging the piston-like member against the liquid pressure force in said cylinder; means cooperable with said piston for varying the liquid pressure in said cylinder in response to movements of said piston so that any movement of said piston in response to an unbalance of said forces is effective to vary said liquid pressure in a direction to rebalance said forces; a liquid pressure gage; means providing a passageway for communication between said cylinder and gage, said means including a restricted vent for said passageway; a valve disposed in said passageway on the gage side of said vent so that when the valve is open said cylinder is in communication with said pressure gage through said passageway and when the valve is closed the pressure gage end of said passageway is closed from the remaining portion of said passageway on the other side of said valve; means operatively connected to the valve and responsive to the pressure on the cylinder side of said valve for automatically opening said valve when said pressure exceeds a predetermined value and holding said valve open as long as said pressure exceeds said valve; and elastic means urging said valve in a closing direction for automatically closing said valve when said pressure drops below a predetermined value.

5. A hydraulic force measuring system as recited in claim 4 in which means are provided for closing said restricted vent passage means substantially simultaneously with opening of said valve.

6. A hydraulic force measuring system comprising means providing a chamber cylinder; a movable piston-like member closing one end of said cylinder; means for supplying a liquid under pressure to said cylinder against said piston-like member; means for subjecting said piston-like member to a force urging the piston-like member against the liquid pressure force in said cylinder; means cooperable with said piston for varying the liquid pressure in said cylinder in response to movements of said piston so that any movement of said piston in response to an unbalance of said forces is effective to vary said liquid pressure in a direction to rebalance said forces; a liquid pressure gage; means providing a passageway for communication between said cylinder and gage, said means including a restricted vent for said passageway; a valve disposed in said passageway on the gage side of said vent and adjacent thereto so that when the valve is open said cylinder is in communication with said pressure gage through said passageway and when the valve is closed the pressure gage end of said passageway is closed from the remaining portion of said passageway on the other side of said valve; means operatively connected to the valve and responsive to the pressure on the cylinder side of said valve for automatically opening said valve when said pressure exceeds a predetermined value and holding said valve open as long as said pressure exceeds said value; elastic means urging said valve in a closing direction for automatically closing said valve when said pressure drops below a predetermined value so that upon the supply of liquid under pressure to said passageway from said cylinder substantially all gas in said passageway on the cylinder side of said valve is first expelled through said restricted vent passage before the pressure in said passageway increases sufficiently to open said valve; and means connected to said valve for movement therewith for closing said restricted vent passage substantially simultaneously with opening of said valve.

References Cited in the file of this patent

UNITED STATES PATENTS

| Number | Name | Date |
|---|---|---|
| 587,786 | Brown | Aug. 10, 1897 |
| 912,597 | McNeil | Feb. 16, 1909 |
| 937,774 | Cunning | Oct. 26, 1909 |
| 2,154,489 | Buck | Apr. 18, 1939 |
| 2,233,498 | Taylor | Mar. 4, 1941 |
| 2,295,871 | Sloan | Sept. 15, 1942 |
| 2,365,443 | Angst | Dec. 19, 1944 |